3,041,286
CATION EXCHANGE MATERIALS AND
THEIR PREPARATION
Mayer B. Goren, Denver, Colo., and Ira D. Elkins, Cushing, Okla., assignors to Kerr-McGee Oil Industries, Inc., a corporation of Delaware
No Drawing. Filed Jan. 12, 1959, Ser. No. 786,014
17 Claims. (Cl. 252—179)

The present invention relates to carbonaceous ion exchange materials and to the preparation of such materials. More particularly, the present invention is concerned with the preparation of carbonaceous cation exchange materials having greatly improved cation exchange capacities in both the hydrogen and alkali metal cycles.

This application is a continuation-in-part of our copending application Serial No. 563,180, filed February 3, 1956, for "Carbonaceous Materials and Their Preparation," now abandoned.

The preparation of carbonaceous ion exchange materials has been described in a number of patents and publications. These materials are generally prepared by treatment of a carbonaceous material such as bituminous coal, peat, lignite, and petroleum asphalts with a sulfonating agent such as oleum, concentrated sulfuric acid, and gaseous sulfur trioxide to introduce reactive groups on a relatively insoluble carbonaceous lattice, capable of undergoing an exchange reaction with various cations in solution. Such sulfonated carbonaceous materials possess certain desirable properties of cation exchange materials to varying degrees, but in general have not proven entirely satisfactory.

Among the characteristics which are desirable in a satisfactory cation exchange material useful for softening or deionizing water are:

(1) A high exchange capacity per unit volume or weight of the cation exchange material.

(2) Physical stability; i.e., resistance toward attrition and fining during use. The particles should be mechanically hard and have good resistance toward crushing as determined by controlled attrition tests in a suitable apparatus such as a ball mill.

(3) Freedom from color throw-off, odors and tastes; i.e., the materials should be relatively insoluble and show a minimum tendency to dissolve in water.

(4) The ion exchange material should not show an excessive adsorptive capacity for the regenerant; i.e., washing out of the excess of acid or salt used in regenerating the cation exchange material should be quickly and easily achieved so that large quantities of wash water are not needed.

By the term "asphaltic bituminous material" as used hereinafter in the specification and claims is meant semi-solid to solid pyrogenous and naturally occurring asphalts (bitumen and pyrobitumen) one or more semi-solid to solid fractions or components thereof, or semi-solid to solid products obtained by blowing these materials or one or more of their components or fractions with air or an oxygen containing gas in the presence or absence of a catalyst. Examples of such naturally occurring materials include gilsonite, grahamite, wurtzilite, albertite, elaterite and native asphalts, such as Trinidad asphalts; while examples of pyrogenous materials include propane asphalts, vacuum reduced crudes, cracked tars, etc. Blown asphaltic bituminous materials include those blown with air or an oxygen containing gas either in the presence or absence of catalysts such as phosphorous pentoxide, ferric chloride, cobaltic salts, etc. By the term "components" or "fractions" of pyrogenous and naturally occurring asphalts is meant asphaltenes, resin and oil mixtures, and separate resin and oil fractions. These may be obtained, for example, by the method described in copending application Serial No. 218,480, filed March 30, 1951, now U.S. Patent No. 2,783,188. Where the term "oil fraction" appears in the specification and claims it is understood that the oil fraction has been blown or treated with a suitable chemical agent before the sulfonation step for the purpose of rendering it semi-solid to solid. The use of chemical treating agents such as aluminum chloride, boron fluoride, and chlorinated materials for this purpose is fully described in U.S. Patent 2,247,375.

The foregoing asphaltic bituminous materials are readily liquefiable, i.e., fluidized on addition of a suitable solvent such as kerosene or other light petroleum distillates or fusible on heating to elevated temperatures, and possess solubility, hardness at normal ambient temperatures, and reaction characteristics desirable in a solid material for the preparation of cation exchange materials. A further advantage of asphaltic bituminous material over the infusible, friable starting materials of the prior art such as coal, is that no loss of fines occur in the grinding of asphaltic bituminous material to a suitable particle size prior to sulfonation since the fines which accumulate may be melted, cast and reground. This is desirable from an economic standpoint as loss of starting material is completely eliminated, thus resulting in a lower cost for the ion exchange product.

It is an object of the present invention to provide an improved cation exchange material having a high cation exchange capacity, good physical stability, excellent resistance to color throw-off and freedom from odor and taste, and a very low adsorptive capacity for the regenerant.

It is a further object of the present invention to provide an improved cation exchange material possessing the foregoing properties in both the hydrogen and alkali metal cycles.

It is still a further object of the present invention to provide a novel process for producing the foregoing improved cation exchange material.

Still other objects of the present invention and the attendant advantages thereof will be apparent to those skilled in the art by reference to the following detailed description and the specific examples further illustrating the present invention.

We have discovered that the reaction product of a $SO_3$ sulfonating agent and asphaltic bituminous material having incorporated therein a non-asphaltic organic substance capable of being removed therefrom by a suitable solvent or chemical action such as by reaction with concentrated sulfuric acid, is greatly improved cation exchange material. In accordance with the process of the present invention, a non-asphaltic organic substance containing carbon, hydrogen, oxygen and/or nitrogen that is liquid at room temperature or a solid melting at a temperature below about 500° F., soluble in concentrated sulfuric acid or reactive with concentrated sulfuric acid to form a sulfuric acid soluble product, soluble or dispersible in asphaltic bituminous material and otherwise capable of being removed therefrom by solvent or chemical action in a subsequent sulfonation step is incorporated in asphaltic bituminous material prior to sulfonation. The non-asphaltic organic substance is then removed during the subsequent sulfonation step leaving numerous minute voids in the surface of the asphaltic bituminous material, thus greatly increasing the effective surface area. When the term "incorporated" is used in the specification and claims it is understood to cover a step such as infusing, engraining, dissolving or dispersing, whereby the fusible non-asphaltic organic substance is substantially uniformly distributed throughout the asphaltic bituminous material in finely divided particles. These particles are preferably of molecular to macro-colloidal dimensions; an average particle size of about 1 to 10 microns or smaller being very satisfactory.

The preferred asphaltic bituminous materials are the fusible or liquefiable bitumens of petroleum origin such as petroleum refined crude bottoms, asphaltic resins, asphaltenes and their blown products.

Materials suitable for incorporation with asphaltic bituminous material are fusible non-asphaltic organic substances. The term non-asphaltic organic substance is intended to include fusible organic materials not falling within the definition of asphaltic bituminous material which are soluble or dispersible in asphaltic bituminous material and extractable therefrom by solvent or chemical action during a subsequent sulfonation step and which have the properties enumerated in the above paragraph.

Examples of non-asphaltic organic substances are coal tar phenolic oils, wood tar phenolic oils such as Suida process scrubbing oils, phenols or derivatives of phenols found in coal tar phenolic oils or wood tar phenolic oils, amines containing 6 through 10 carbon atoms, inclusive, that are soluble in sulfuric acid or which react with sulfuric acid to produce a soluble reaction product, fatty acids containing about 12–18 carbon atoms, glycerides of fatty acids containing about 12–18 carbon atoms, etc. Specific examples of phenols or derivatives of phenols found in coal tar phenolic oils or wood tar phenolic oils derived therefrom are phenol, xylenol, guaiacol, resorcinol, pyrogallol, mono and di-alkyl ethers of polyhydroxy benzenes, etc. Examples of amines containing 6–10 carbon atoms which are suitable are primary, secondary or tertiary aliphatic amines, aminobenzenes, and lower alkyl substituted aminobenzenes, such as aniline, methyl aniline, dimethyl-aniline, ethyl aniline, tri-ethyl amine, di-propyl amine, amyl amine, di-amyl amine, etc. Specific examples of fatty acids containing 12–18 carbon atoms which are suitable in practicing in the present invention are lauric, myristic, palmitic, stearic, oleic, ricinoleic, petrolselinic, vaccenic, linoleic, linolenic, eleostearic, licanic, parinaric, tariric, etc. In addition, glycerides of the above mentioned fatty acids are suitable and may be substituted therefor. Examples of naturally occurring substances containing at least one of the above fatty acids or a glyceride thereof which may be used in practicing the present invention are vegetable and animal oils or fats such as coconut oil, palm kernel oil, palm oil, olive oil, castor oil, peanut oil, rape oil, tallow, lard, soy bean oil, cotton seed oil, tallow distillation residues, tall oil, etc. Usually, distillation residues or other low grade materials resulting from processing of these naturally occurring substances are equally satisfactory and are often preferred from an economic standpoint. Examples of such materials are tallow distillation residues, soy bean oil distillation residues, etc.

A preferred procedure for incorporating the fusible non-asphaltic organic substance in asphaltic bituminous material comprises heating the asphaltic bituminous material to a temperature high enough to achieve a working fluidity and then slowly adding a minor quantity by weight of liquor or melted non-asphaltic organic substance thereto with vigorous agitation. The quantity of added non-asphaltic organic substance is preferably 0.5 to 10% by weight, but larger quantities may be added. The resultant fused mixture is permitted to cool sufficiently to solidify and it may then be crushed and sized to obtain particles which will pass through a 10 mesh screen but which are retained on 50 mesh screen. The fines passing the 50 mesh screen may be re-fused, re-solidified, and re-ground to obtain additional 10 to 50 mesh material. The 10 to 50 mesh material thus obtained contains the fusible non-asphaltic organic substance substantially molecularly to macro-colloidally incorporated throughout the individual 10 to 50 mesh particles.

If desired, the asphaltic bituminous material may be fluidized by incorporating therewith a light petroleum distillate such as kerosene with or without heating. When heated, a much lower temperature is required to assure a working fluidity than in the absence of the petroleum distillate and thus this procedure is preferred where the non-asphaltic organic substance has a boiling point sufficiently low so as to be lost by evaporation at the normal softening point of the asphaltic bituminous material. The non-asphaltic organic substance is then added to the fluidized asphaltic bituminous material with vigorous agitation and in such a manner as to assure uniform distribution in finely divided form. The light petroleum distillate may be removed by evaporation upon warming the resulting mixture thereby resulting in its solidification and the solidified mixture cooled, crushed and sized to obtain particles of a desired size for sulfonation.

After incorporation of the non-asphaltic organic substance in asphaltic bituminous material as outlined above, sulfonation may be carried out on the 10 to 50 mesh material by any suitable method. For example, suitable methods for sulfonation include sulfonation at a temperature of about 70° to 212° F. with concentrated sulfuric acid, sulfonation with concentrated sulfuric acid followed by resulfonation with sulfur trioxide, or sulfonation with concentrated sulfuric acid followed by resulfonation with oleum as described in our copending application Serial No. 342,728, filed March 16, 1953, now U.S. Patent No. 2,748,057. The last named method of sulfonation is especially preferred in order to obtain a superior cation exchange material. The foregoing sulfonation agents are sometimes referred to herein as $SO_3$ sulfonating agents.

The following specific examples are for the purpose of further illustrating the present invention.

EXAMPLE I

A vacuum reduced petroleum asphalt was treated with 10 volumes of pentane to precipitate asphaltenes therefrom. The asphaltenes were then separated from the pentane solution and warmed until substantially free of pentane.

One kilogram of asphaltenes prepared as outlined above was used by heating to about 400° F. and then 50 grams of phenol were slowly added thereto with vigorous agitation which served to disperse the phenol uniformly through the molten mass of asphaltenes. The phenol tended to evaporate from the surface of the hot asphaltenes and for this reason it was desirable to complete the dispersion of phenol as rapidly as possible and with simultaneous and vigorous agitation, as well as use of the lowest possible temperature at which a working fluidity could be achieved. The resulting molten mixture was allowed to cool until solidified and then the solidified mass was ground to 10 to 50 mesh material. Any oversize material was re-ground and re-screened while fines were re-melted, re-cast and re-ground to obtain additional material within the 10 to 50 mesh particle size.

The 10 to 50 mesh material prepared as outlined above was found to contain phenol molecularly to macro-colloidally dispersed throughout the individual 10 to 50 mesh particles.

EXAMPLE II 100 grams of 10 to 50 mesh asphaltenes containing about 5% of phenol molecularly to macro-colloidally dispersed throughout the individual 10 to 50 mesh particles was prepared as described in Example I. This 10 to 50 mesh material was then treated with 300 grams of 98% sulfuric acid at 100° F. for a period of two hours.

100 grams of the once sulfonated product obtained as above was sulfonated a second time by treating with 300 grams of 20% oleum at 100° F. for a period of two hours. The twice sulfonated product thus obtained was washed free of excess acid and then neturalized with excess sodium hydroxide solution. The sodium hydroxide solution was allowed to stand for several hours over the sulfonated product, then decanted and the sulfonated product washed free of sodium hydroxide solution and dried.

An ion exchange column was charged with the twice sulfonated product obtained by the foregoing procedure and used to de-mineralize standard hard water (400 p.p.m. calcium carbonate) until exhausted, then regenerated with hydrogen chloride solution. This de-mineralization and regeneration cycle was repeated over numerous such cycles until the twice sulfonated material showed fatigue, as indicated by an inability to be effectively regenerated and a decrease in the volume of standard hard water de-mineralized before exhaustion.

The following results were obtained:

| Cycles operated: | Standard hard water equivalent in ml. per cycle |
|---|---|
| 10 | 8,000 |
| 112 | 8,800 |
| 138 | 9,000 |
| 240 | 8,850 |

It is apparent from the foregoing data that the double sulfonation product of the present invention was still operating very successfully even after 240 cycles, while a product disclosed in my copending application Serial No. 342,728, filed March 16, 1953, had a standard hard water equivalent of no more than 6,500 ml. after only 13 cycles of operation.

EXAMPLE III

A material was prepared for sulfonation identical with that of Example I, with the exception of 50 grams of aniline being substituted for the 50 grams of phenol used in Example I. The 10 to 50 mesh starting material for subsequent sulfonation thus contained about 5 parts of aniline molecularly to macro-colloidally incorporated in 100 parts of asphaltenes.

The above material was then sulfonated in accordance with the double sulfonation process of Example II. An ion exchange column was charged with the double sulfonation product thus obtained and used to de-mineralize standard hard water (400 p.p.m. calcium carbonate) over numerous cycles and as outlined in Example II. The results thus obtained indicated a high capacity and cycle life similar to that of the double sulfonation product of Example II.

Tests run on a sample of the material of the example and selected after the first sulfonation step showed the single sulfonation product to be inferior to the double sulfonation product of the example. However, the single sulfonation product of this example was better than the single sulfonation product of pure asphaltenes having no aniline incorporated therein.

EXAMPLE IV

The procedure of Example I was followed with the exception that Suida process scrubbing oil having a boiling range of about 170–350° C. and containing mono and di-alkyl ether derivatives of polyhydroxy benzenes such as resorcinol having 6–10 carbon atoms, was substituted for the phenol of Example I.

The 10 to 50 mesh material prepared in accordance with this example using the Suida process scrubbing oil was sulfonated and tested in accordance with the procedure of Example II. The results of the tests are tabulated below in Table I.

*Table I*

| Sample No. | 1 | 2 | 3 | 4 | 5 | 6 |
|---|---|---|---|---|---|---|
| Phenolic content, percent by diazo test | 0 | 0.2 | 0.6 | 1 | 5 | 10 |
| Standard hard water equivalents in ml. per cycle at indicated number of cycles: | | | | | | |
| 10 | 6,500 | 6,600 | 7,700 | 7,900 | 8,500 | 8,600 |
| 138 | (1) | (1) | 7,790 | 8,000 | 8,500 | 8,600 |
| 240 | | | 8,000 | | 8,600 | |

[1] Capacity decreased.

Light and heavy tar oils obtained by the destructive distillation of wood or wood tars may be substituted in this example for Suida process scrubbing oils with substantially identical results. However, at least 0.5% of a phenolic substance or derivative must be present in the material to be sulfonated.

EXAMPLE V

The procedure of Example I was followed with the exception of substituting a channel coal tar having a specific gravity at 50° C. of about 0.9 for the phenol of Example I. This tar contained considerable quantities of paraffins and 5–10% of phenols such as phenol, cresols, xylenols, cresylic acid. The resulting 10–50 mesh product contained 4–6% of the above phenols as determined by the modified diazo test described in the text "Asphalts and Allied Substances" by Abraham.

The 10–50 mesh product was sulfonated according to the procedure of Example II. The sulfonated product was tested and found to have an exceptionally high ionic exchange capacity in the sodium cycle even after 200 cycles of use.

EXAMPLE VI

Various blends of asphaltenes and organic amines were prepared in accordance with the teachings of Example I by heating the asphaltene until melted and adding the amine with stirring. A closed container was used to prevent loss of the amine by vaporization. The resulting blends were cooled, solidified and crushed to obtain a 20–40 mesh product. The sized samples were sulfonated in particulate form in accordance with the procedure of Example II and then tested for cycle life and ion-exchange capacity.

The results at 15 cycles are tabulated below in Table II.

*Table II*

| Amine in sample: | Average capacity, ml. |
|---|---|
| Triethyl amine | 7,800 |
| Di-amyl amine | 8,100 |

An attempt to determine the exact amount of triethyl amine extracted from the amine-asphaltene blend during sulfonation gave inconclusive results due to the dark color of the asphaltenes which tended to mask any color developed when the extract was treated to prepare an amine derivative. However, it was easily demonstrated that the amines formed sulfuric acid soluble adducts and a portion of the amine content of the sample was transferred to the sulfuric acid during the sulfonation step.

The foregoing detailed description and specific examples illustrating the present invention are for the purposes of illustration only and are not to be taken as limiting to the scope of the appended claims.

What is claimed is:

1. A process for preparing a cation exchange material which comprises incorporating with asphaltic bituminous material about 0.5–10% by weight of at least one organic substance selected from the group consisting of hydroxybenzenes and their ether derivatives, aminobenzenes, lower alkyl substituted aminobenzenes, aliphatic amines containing 6 through 10 carbon atoms, coal tar phenolic oils, and wood tar phenolic oils, and sulfonating the resulting mixture with an $SO_3$ sulfonating agent to produce a cation exchange material, the organic substance being substantially uniformly incorporated with the asphaltic bituminous material and at least a portion of the organic substance being removed therefrom during the sulfonation step.

2. The process of claim 1 wherein the organic substance comprises a phenol.

3. The process of claim 1 wherein the organic substance comprises an aliphatic amine containing 6 through 10 carbon atoms.

4. The process of claim 1 wherein the organic substance comprises aniline.

5. The cation exchange material prepared by the process of claim 1.

6. A process for preparing a cation exchange material which comprises incorporating with asphaltenes about 0.5–10% by weight of at least one organic substance selected from the group consisting of hydroxybenzenes and their ether derivatives, aminobenzenes, lower alkyl substituted aminobenzenes, aliphatic amines containing 6 through 10 carbon atoms, coal tar phenolic oils, and wood tar phenolic oils, and sulfonating the resulting mixture with an $SO_3$ sulfonating agent to produce a cation exchange material, the organic substance being substantially uniformly incorporated with the asphaltenes and at least a portion of the organic substance being removed therefrom during the sulfonation step.

7. The process of claim 6 wherein the organic substance comprises a phenol.

8. The process of claim 6 wherein the organic substance comprises an aliphatic amine containing 6 through 10 carbon atoms.

9. The process of claim 6 wherein the organic substance comprises aniline.

10. A process for preparing a cation exchange material which comprises incorporating with fluidized asphaltic bituminous material about 0.5–10% by weight of at least one organic substance selected from the group consisting of hydroxybenzenes and their ether derivatives, aminobenzenes, lower alkyl substituted aminobenzenes, aliphatic amines containing 6 through 10 carbon atoms, coal tar phenolic oils, and wood tar phenolic oils, solidifying the resulting fluidized mass, crushing and classifying the solidified mass to obtain a particle size of from 10 to 50 mesh, and sulfonating the classified particles of the asphaltic bituminous material with an $SO_3$ sulfonating agent to produce a cation exchange material, the organic substance being substantially uniform incorporated with the asphaltic bituminous material and at least a portion of the organic substance being removed therefrom during the sulfonation step.

11. The process of claim 10 wherein the organic substance comprises a phenol.

12. The process of claim 10 wherein the organic substance comprises an aliphatic amine containing 6 through 10 carbon atoms.

13. The process of claim 10 wherein the organic substance comprises aniline.

14. A process for preparing a cation exchange material which comprises incorporating with fluidized asphaltenes about 0.5–10% by weight of at least one organic substance selected from the group consisting of hydroxybenzenes and their ether derivatives, aminobenzenes, lower alkyl substituted aminobenzenes, aliphatic amines containing 6 through 10 carbon atoms, coal tar phenolic oils, and wood tar phenolic oils, solidifying the resulting fluidized mass, crushing and classifying the solidified mass to obtain a particle size of from 10 to 50 mesh, and sulfonating the asphaltenes of the classified particles with an $SO_3$ sulfonating agent to produce a cation exchange material, the organic substance being substantially uniformly incorporated with the asphaltenes and at least a portion of the organic substance being removed therefrom during the sulfonation step.

15. The process of claim 14 wherein the organic substance comprises a phenol.

16. The process of claim 14 wherein the organic substance comprises an aliphatic amine containing 6 through 10 carbon atoms.

17. The process of claim 14 wherein the organic substance comprises aniline.

References Cited in the file of this patent

UNITED STATES PATENTS

| | | |
|---|---|---|
| 1,642,594 | Petroff et al. | Sept. 13, 1927 |
| 2,260,971 | Goetz | Oct. 28, 1941 |
| 2,309,365 | Urbain | June 26, 1943 |